US005864764A

United States Patent [19]
Thro et al.

[11] Patent Number: 5,864,764
[45] Date of Patent: Jan. 26, 1999

[54] INFRASTRUCTURE TRANSCEIVER AND METHOD FOR CONFIGURATION BASED ON LOCATION INFORMATION

[75] Inventors: Stuart W. Thro, Cary; Mark L. Shaughnessy, Algonquin; Michael D. Kotzin, Buffalo Grove, all of Ill.

[73] Assignee: Motorola, Inc., Schaumburg, Ill.

[21] Appl. No.: 758,268

[22] Filed: Nov. 25, 1996

[51] Int. Cl.$^6$ ................................................. H04B 1/06
[52] U.S. Cl. .......................................... 455/561; 455/446
[58] Field of Search .................................. 455/427, 431, 455/432, 433, 434, 435, 438, 439, 446, 450, 456, 507, 509, 524, 525, 552, 553, 554, 560, 561

[56] References Cited

U.S. PATENT DOCUMENTS

| | | | |
|---|---|---|---|
| 5,121,126 | 6/1992 | Clagett ..................................... | 455/456 |
| 5,155,490 | 10/1992 | Spradley et al. ......................... | 342/357 |
| 5,265,150 | 11/1993 | Helmkamp et al. ...................... | 455/555 |
| 5,278,835 | 1/1994 | Ito et al. .................................. | 455/452 |
| 5,436,955 | 7/1995 | Kaewell, Jr. et al. ................... | 455/561 |
| 5,437,056 | 7/1995 | Rautiola .................................. | 455/452 |
| 5,475,870 | 12/1995 | Weaver, Jr. et al. ..................... | 455/524 |
| 5,491,837 | 2/1996 | Hartsen ................................... | 455/437 |
| 5,528,597 | 6/1996 | Gerzberg et al. ........................ | 455/422 |
| 5,535,259 | 7/1996 | Dent et al. ............................... | 455/452 |
| 5,546,445 | 8/1996 | Dennison et al. ....................... | 455/456 |
| 5,561,701 | 10/1996 | Ichikawa ................................. | 455/502 |
| 5,561,704 | 10/1996 | Salimando .............................. | 455/456 |
| 5,561,839 | 10/1996 | Osterberg et al. ....................... | 455/446 |
| 5,568,153 | 10/1996 | Beliveau ................................. | 455/433 |
| 5,574,974 | 11/1996 | Almgren et al. ........................ | 455/524 |
| 5,584,049 | 12/1996 | Weaver, Jr. et al. ..................... | 455/524 |
| 5,603,081 | 2/1997 | Raith et al. .............................. | 455/435 |
| 5,604,765 | 2/1997 | Bruno et al. ............................. | 455/38.3 |
| 5,613,211 | 3/1997 | Matsuno ................................. | 455/502 |
| 5,628,052 | 5/1997 | DeSantis et al. ........................ | 455/562 |
| 5,642,398 | 6/1997 | Tiedemann, Jr. et al. .............. | 455/426 |
| 5,646,632 | 7/1997 | Khan et al. ............................. | 455/524 |
| 5,678,182 | 10/1997 | Miller et al. ........................... | 455/12.1 |
| 5,691,982 | 11/1997 | Vuori et al. ............................. | 370/336 |
| 5,692,031 | 11/1997 | Sharp et al. ............................. | 379/34 |
| 5,715,522 | 2/1998 | Vimpari et al. ......................... | 455/571 |
| 5,722,073 | 2/1998 | Wallstedt et al. ....................... | 455/436 |

OTHER PUBLICATIONS

41st IEEE Vehicular Technology Conference, 1991, "Autonomous Frequency Assignment and Access For TDMA Personal Portable Radio Communications" by Justin C–I Chuang pp. 699–703.

*Primary Examiner*—Reinhard J. Eisenzopf
*Assistant Examiner*—Makoto Aoki
*Attorney, Agent, or Firm*—Susan L. Lukasik

[57] ABSTRACT

In a radio frequency communication system (100), infrastructure transceivers operate in a configuration mode (301–306) and an active mode (307). When in the configuration mode, a given infrastructure transceiver (106–109) derives information regarding RF operating circumstances proximal to the infrastructure transceiver. The information regarding the RF operating circumstances, information regarding the infrastructure transceiver itself, and optionally information regarding present location of the infrastructure transceiver, is transmitted to a communication system configuration server (105). In response, information regarding operation of the infrastructure transceiver is received by the infrastructure transceiver. When in the given infrastructure transceiver is in the active mode, the information regarding operation of the infrastructure transceiver is used to support communications in the RF communication system. With each infrastructure transceiver operating in this manner, the radio frequency communication system can be automatically configured.

5 Claims, 4 Drawing Sheets

INFRASTRUCTURE TRANSCEIVER AND METHOD FOR CONFIGURATION BASED ON LOCATION INFORMATION

CROSS-REFERENCE TO RELATED APPLICATIONS

Related subject matter is disclosed in U.S. application Ser. No. 08/758,270 entitled INFRASTRUCTURE TRANSCEIVER AND METHOD FOR CONFIGURATION BASED ON RF OPERATING CIRCUMSTANCES.

FIELD OF THE INVENTION

The present invention relates generally to radio frequency communication systems and, in particular, to an infrastructure transceiver and a method for use in a radio frequency communication system.

BACKGROUND OF THE INVENTION

Cell-based radio frequency (RF) communication systems are well-known in the art. In such systems, a cell typically comprises a limited coverage area throughout which communications are provided using predetermined RF carrier frequencies. An overall coverage area comprising all of the limited coverage areas is created by strategically locating a plurality of cells adjacent one another. By networking operations of the plurality of cells through a central network controller, seamless communications are provided throughout the overall coverage area. With such a configuration, it is inevitable, and often desired, that there will be areas of overlapping coverage area between adjacent or nearly adjacent cells. In such an overlap area, communications can be achieved using the RF carrier frequencies of any of the cells contributing to the overlap area.

In order to maintain even coverage throughout the overall coverage area, the RF carrier frequencies, and their respective transmit powers, within each cell must be carefully selected so as not to interfere with communications in overlapping cells. This problem is made even more difficult when the effects of topographical limitations (e.g., the terrain and structures within the overall coverage area) are factored into the determination of cell placement. Currently, system design is typically determined using a two step process: extensive simulations followed by exhaustive field measurements. That is, computer programs are used to simulate the expected interactions between cells given baseline assumptions about cell placement, frequency usage, transmit power levels and a variety of other factors. When acceptable results are predicted through simulation, empirical measurements are made in the actual system, set up in accordance with the simulation. The empirical measurements assist the system designers in determining the sufficiency of coverage of the system. If necessary, the simulation is revised based on the empirical measurements, and the whole process is continuously iterated until satisfactory results are achieved.

While the above-described method for system design works, it is expensive both in terms of cost and time. Furthermore, with the advent of so-called micro-cells systems, an area previously provided RF coverage by a single cell may now be provided coverage with dozens of cells. This multiplication of cells greatly increases the complexity, and therefore the cost and time spent, in determining a satisfactory system design. Thus, it would be advantageous to provide equipment for use in an RF communication system capable of automatically facilitating satisfactory system configuration.

DESCRIPTION OF A PREFERRED EMBODIMENT

Generally, the present invention describes an infrastructure transceiver capable of supporting automatic configuration of an RF communication system. In particular, the infrastructure transceiver has at least two operating modes: a configuration mode and an active mode. When in the configuration mode, the infrastructure transceiver samples an RF environment to derive information regarding RF operating circumstances proximal to the infrastructure transceiver. The information regarding the RF operating circumstances, information regarding the infrastructure transceiver itself, and optionally information regarding present location of the infrastructure transceiver is transmitted to the RF communication system. In response, information regarding operation of the infrastructure transceiver is received by the infrastructure transceiver from the RF communication system. When in the active mode, the infrastructure transceiver uses the information regarding operation of the infrastructure transceiver to support communications in the RF communication system.

Additionally, the present invention describes a communication system configuration server, forming part of the RF communication system, that receives the information regarding the RF operating circumstances, the information regarding the infrastructure transceiver, and optionally the information regarding location of the transceiver. Using stored information regarding the RF communication system, the information regarding the RF operating circumstances, the information regarding the infrastructure transceiver, and the information regarding location of the transceiver, the communication system configuration server determines configuration information for the infrastructure transceiver, which configuration information is subsequently sent to the infrastructure transceiver. In this manner, the present invention allows an RF communication system to be automatically configured.

Figure 1:
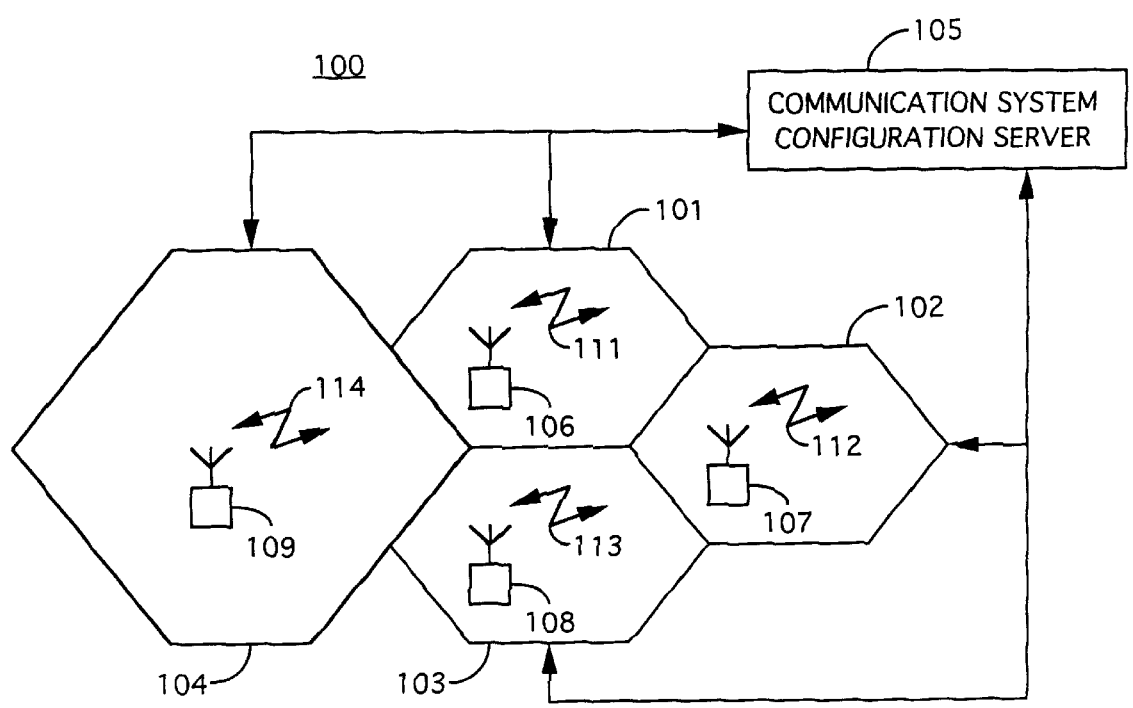
FIG. 1 is a block diagram of an RF communication system in accordance with the present invention.

The present invention may be more fully described with reference to FIGS. 1–4. FIG. 1 is a block diagram of an RF communication system 100 comprising a plurality of cells 101–104, each linked to a communication system configuration server 105. As shown, the coverage area of each cell may vary in size from relatively large to small. For example, a larger cell (e.g., cell 104) may provide coverage over a several hundred square mile area, whereas a smaller cell (e.g., cell 102) may provide coverage over only a one square mile area, or perhaps much less.

The coverage area of each cell 101–104 is defined by the transmitting capabilities of their respective infrastructure transceivers 106–109. Each infrastructure transceiver 106–109 is capable of transmitting and receiving using at least one assigned radio frequency channel (or pair of channels) 111–114. For example, the channels could be in the 800 MHz band, using time-division multiple access (TDMA) modulation such as that used in an "IDEN" system provided by Motorola, Inc. Alternatively, the channels could be of the spread spectrum type, using digitally coded modulation, as known in code-division multiple access (CDMA) RF techniques. Although the coverage areas of each cell are shown as having well-defined boundaries, in practice there is typically a significant amount of overlapping coverage area between adjacent cells (e.g., cells 101 and 103) and often between nearly adjacent cells (e.g., cells 102 and 104). Additionally, the cells 101–104 are networked via a central controller (not shown) such that communications throughout the RF communication system are properly coordinated, e.g., call establishment and termination, mobile location tracking, and call handover procedures.

According to one possible implementation, the communication system configuration server 105 comprises a centrally located processing facility having significant computational and storage capabilities. For example, a suitable communication system configuration server 105 is a medium or large computing device, such as those manufactured by Tandem, Inc. or Hewlett Packard, or possibly even a so-called super computer, depending upon the size and number of cells in the system. The communication system configuration server 105 is preferably linked to each infrastructure transceiver 106–109 through a land-based communication link, such as well-known wireline, fiber optic, terrestrial microwave, satellite links, or a combination of such links. These links may be part of a large local area/wide area network (LAN/WAN) as known in the data communication art.

According to another implementation, the functionality of the communication system configuration server could be distributed among many smaller computers (PC or workstation size) located at throughout the network, or as part of the infrastructure transceivers 106–109 themselves. In this case, the distributed computers would be interconnected using a LAN/WAN.

Figure 2:
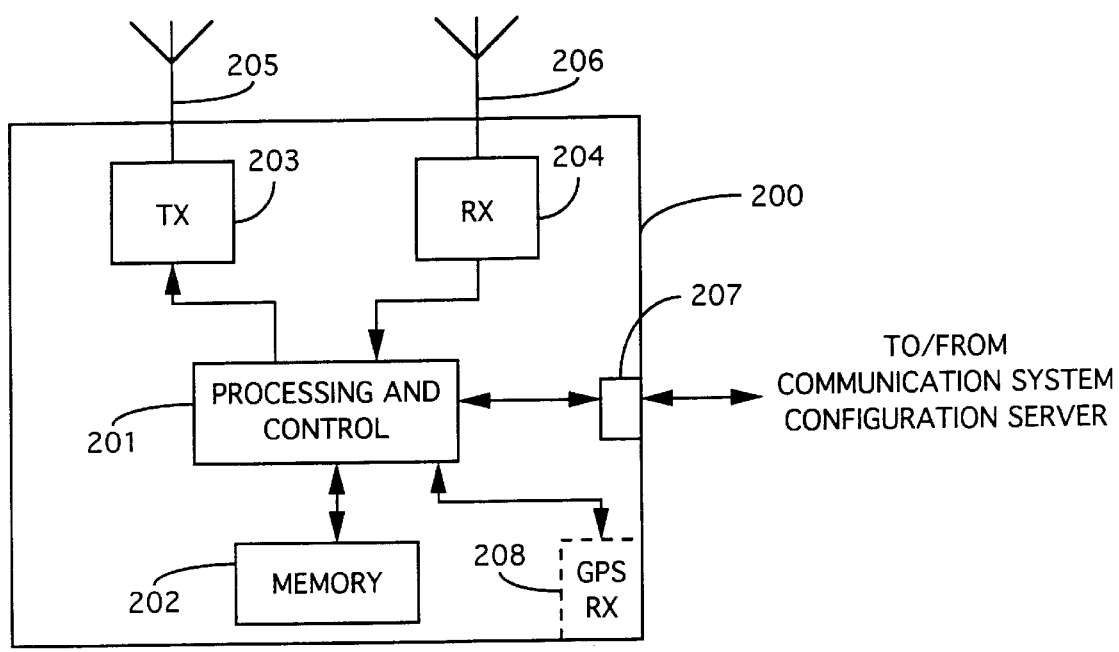
FIG. 2 is a block diagram of an infrastructure transceiver in accordance with the present invention.

FIG. 2 is a block diagram of an infrastructure transceiver 200 comprising processing and control means 201, memory 202, a transmitter 203, a receiver 204, antennas 205–206, a configuration server connection 207 and, optionally, a Global Positioning Satellite (GPS) receiver 208. The infrastructure transceiver 200 is representative of each of the transceivers 106–109 shown in FIG. 1. A suitable platform for implementing the infrastructure transceiver 200 is an Enhanced Base Transceiver System (EBTS), manufactured by Motorola, Inc. and described in Motorola Equipment Manual 68P81091E20, suitably modified to implement the procedures described below. The transmitter 203 and receiver 204 are of the sort well known in the art, preferably operating in the RF band. Optimally, the receiver 204 is of the type equipped to accurately measure the power level of received signals, and to deliver this signal strength data to the processing and control means 201. The transmitter 203 and receiver 204 normally operate at different carrier frequencies, but are capable of operating at any of a plurality of assigned frequencies. Additionally, although two antennae 205–206 are shown, a single antenna may be used in combination with well-known antenna combining techniques to support both transmitter 203 and receiver 204.

The processing and control means 201 comprise computational devices (e.g., microprocessors, microcontrollers and/or digital signal processors as known in the art) capable of executing the steps described below. In particular, the processing and control means 201 direct the operations of the transmitter 204 and receiver 203, including the transmission/reception of voice/data and possibly control information as well. Also, the processing and control means 201 handle communications with a communication system configuration server via the configuration server connection 207. The configuration server connection 207 comprises input/output drivers capable of supporting protocols (such as TCP/IP, Frame Relay, ATM, or ISDN) used for communications with a communication system configuration server. Although shown separate from the processing and control means 201, in practice, the functionality of the configuration server connection 207 may be partially or fully incorporated into the processing and control means 201. In the preferred embodiment, the configuration server connection 207 supports a high-speed data interconnection protocol such as IEEE 802.7 (Ethernet), ISDN, ATM or similar proprietary technology.

Suitable devices for the memory 202 include volatile and/or non-volatile memory devices, such as random-access memory (RAM), read-only memory (ROM), electrically erasable programmable read-only memory (EEPROM) and the like. The memory 202 stores data necessary for the operation of the transceiver including, but not limited to, software instructions (embodying, in part, the methods described herein below) capable of being executed by the processing and control means 201. Additionally, the memory 202 includes information regarding the infrastructure transceiver. Such information may comprise an identification code of the infrastructure transceiver (as provided by the manufacturer of the transceiver) and operating capabilities of the infrastructure transceiver. Operating capabilities further include, but are not limited to: identification of at least one RF carrier frequency at which the infrastructure transceiver can operate (i.e., transmit and/or receive); information regarding wireless communication protocols/ modulations (such as GSM, TETRA, TIA-IS95A (CDMA), or "IDEN" air interface protocols) which the infrastructure transceiver is capable of supporting; information regarding a number of carriers which can be simultaneously transmitted or received, transmitter power output and cutback capabilities, receiver sensitivities, and the like; information regarding hardware configuration of the infrastructure transceiver such as processor speed, memory capacity, hardware component versions and the like; and information regarding software configuration of the infrastructure transceiver such as version numbers of various software modules or a list of features enabled in the transceiver.

The optional GPS receiver 208, when included, serves to determine a geographic location of the infrastructure transceiver 200 and provide such location to the processing and control means 201. As known in the art, the GPS receiver provides geographic coordinates (for example, latitude, longitude, and altitude) to within 50–100 feet accuracy. Such location information can be used in the determination of operating information for the infrastructure transceiver 200, as described below. It is understood that other equipment, capable of determining location information, is generally known in the art and may be used in place of, or in addition to, the GPS receiver 208.

The present invention contemplates at least two modes of operation for the infrastructure transceiver 200: a configuration mode and an active mode. These modes are further described with reference to FIGS. 3 and 4, which illustrate a flowchart of operation for an infrastructure transceiver and a flowchart of operation for a communication system configuration server, respectively. Generally, the configuration mode of an infrastructure transceiver is described in steps 301–306, and the active mode is described in step 307.

At step 301, an infrastructure transceiver is initialized. In particular, the transceiver is connected to a network such that it can communicate with a configuration server. Also, any information regarding the infrastructure transceiver, not previously stored, may be entered into the transceiver's memory at the time of initialization. This additional information includes, but is not limited to: a network address for the communication system configuration server; the operating capabilities described above, if not previously entered at the time of manufacture; and, optionally, the geographic location coordinates for that transceiver. If a device for determining location (e.g., the GPS receiver 208) is not included as part of the transceiver, the geographic coordinates (location information) entered at step 301 may comprise known latitude and longitude coordinates, postal address or similarly convenient address.

At step 302, the transceiver establishes communication with the configuration server and transmits the information regarding the transceiver to the configuration server using the configuration server's network address. In the case where the infrastructure transceiver has been initialized (step 301), a registration message, indicating to the configuration server that the infrastructure transceiver is new to the system, is also included. Additionally, in order to facilitate communications with the configuration server, the information regarding the transceiver also preferably includes a network address for the infrastructure transceiver. If the transceiver includes a GPS receiver or other similar location-determining device, location information for the transceiver is sent along with the information regarding the infrastructure transceiver.

At step 303, responsive to the transmitting of step 302, the infrastructure transceiver receives at least some information regarding operation of the infrastructure transceiver. The information regarding operation of the infrastructure transceiver includes a system identification corresponding to the RF communication system, a site identification assigned to the infrastructure transceiver, a list of modulation types that may be used within the RF communication system, and information that identifies those RF channels which are available for use proximal to the infrastructure transceiver. While the RF channels thus identified are potentially available for use, it may be determined at a later time that such RF channels are in fact inappropriate for use by the infrastructure transceiver, as described below. Additionally, the information regarding operation of the transceiver may optionally include executable software Instructions, in the form of object code, for use by the infrastructure transceiver Such software instructions are stored in the memory of the transceiver and used to implement any control or service features normally provided by the transceiver. For example, the latest version of a given software module or modules could be received if the information regarding operating capability of the transceiver (sent at step 302) indicated that the transceiver did not have the latest version of that software. This latest version of software may also include software for the digital signal processor(s) to enable encoding and decoding of the at least one RF modulation type at that cell.

With the information regarding operation of the transceiver, the infrastructure transceiver configures itself and initiates a scan, at step 304, of its surrounding RF environment to derive information regarding RF operating circumstances proximal to the infrastructure transceiver. Techniques for sampling an RF environment are well-known in the art. In practice, this sampling step of the configuration mode can be performed in response to one of five stimuli: i) upon power-up/configuration of the infrastructure transceiver, ii) upon receiving a direct command from a controlling entity such as a configuration server, iii) upon detection of an external event, iv) periodically according to a predetermined schedule, or v) during idle periods while in an active mode (described below). The first stimulus would occur whenever a transceiver is made operational for the first time (e.g., a purchaser of the transceiver "plugs in" the transceiver for the first time) or following a sustained loss of power (e.g., after the transceiver has been moved) and is illustrated as step 301, described above. The second stimulus would occur if, for example, the configuration server wanted to verify the RF operating conditions of a given transceiver, or if a transceiver in the system were removed and the configuration server wanted to adjust neighboring transceivers to provide coverage in the now-uncovered area. The third stimulus can encompass any of a number of events which the transceiver is capable of detecting, such as the occurrence of a large number of receiving errors or the temporary loss of communications with the RF communication system. Finally, the fourth and fifth stimuli would be used as an ongoing maintenance and diagnostic feature for the RF communication system.

The information regarding RF operating circumstances includes any information relevant to determining the current state of RF communications proximal to the infrastructure transceiver. To this end, the transceiver configures itself to use the modulation types identified in the previous step. The receiver of the infrastructure transceiver is then tuned, in turn, to each of the RF channels also identified in the previous step. While tuned into each RF channel, the received power for each RF channel is measured and, if possible, corresponding system and site identifications for each RF channel are also determined. Optionally, the transceiver could sample activity on additional channels not identified in the previous step. For example, the transceiver, when sampling the RF environment, could scan the very-high frequency (VHF) and ultra-high frequency (UHF) bands and report on any channels showing activity above a predetermined power threshold, such as −105 dBm. The value of such a predetermined power threshold is a design choice and may be kept static or adaptively modified during the scan. This procedure is repeated for each possible modulation type identified in the previous step. It is understood that other RF1 related parameters, measurable by the infrastructure transceiver, may be included in the information regarding RF operating circumstances, particularly any parameters relating to the determination of existing and/or potential interference conditions.

Upon completion of the scan, the transceiver transmits the information regarding the RF operating circumstances to the configuration server at step 305. Referring to FIG. 2, the information regarding RF operating circumstances and the information regarding the infrastructure transceiver would preferably be sent via the configuration server connection 207.

At step 306, responsive to the previous step of transmitting, the infrastructure transceiver receives additional information regarding operation of the transceiver from the communication system configuration server. In particular, the transceiver receives at least one operating parameter which is to be used by the transceiver during the active mode. Thus, any of a number of parameters normally required for the operation of an infrastructure transceiver, as understood by those having ordinary skill in the art, may be included in the at least one operating parameter. Examples of such parameters include, but are not limited to, identification of traffic and/or control channels, channel spacings, transmit power limits, receive threshold sensitivities, acceptable co-channel interference thresholds, digital filter parameters, and the like.

At a minimum, the at least one operating parameter includes at least one RF channel assignment (transmit and/or receive frequencies), corresponding maximum transmit power levels for the assigned channels, and a list of neighboring infrastructure transceivers. If a default modulation type is not assumed, information regarding modulation types for each of the RF channel assignments may also be included. For example, the at least one parameter may specify a single transmitter channel of 820.0125 MHz not to exceed a transmit power level of 30 watts, and a single receiver channel of 865.0125 MHz; both channels being designated to operate in accordance with "IDEN" TDMA air interface protocol requirements. As another example, the at least one parameter may specify a wide-band CDMA frequency of 931.0 MHz, and a set of allowed communications codes at that cell.

The at least one operating parameter may also comprise information regarding the neighboring infrastructure transceivers, that is transceivers proximal to a first transceiver which are capable of delivering radio channel interference at the transceiver location. Referring to the example illustrated in FIG. 1, the list of neighboring infrastructure transceivers for transceiver 106 includes transceivers 107–109. Examples of such information regarding neighboring infrastructure transceivers include, but are not limited to, neighboring site identifiers, site locations, RF channels and modulation parameters being used at that site, expected co-channel interference levels received from that site, identification of those sites to be used for handover processing, and the like.

The infrastructure transceiver may also optionally receive, if not previously provided by the transceiver, information identifying a location of the infrastructure transceiver. That is, if the infrastructure transceiver is not equipped with a GPS receiver or similar device, the neighboring transceivers could measure the power and propagation delay for signals transmitted by the transceiver (at the instigation of the configuration server), and transmit these parameters to the communications system configuration server. The configuration server then uses these parameters and the known locations of neighboring transceivers to calculate the location of the transceiver, as known in the art.

Figure 3:
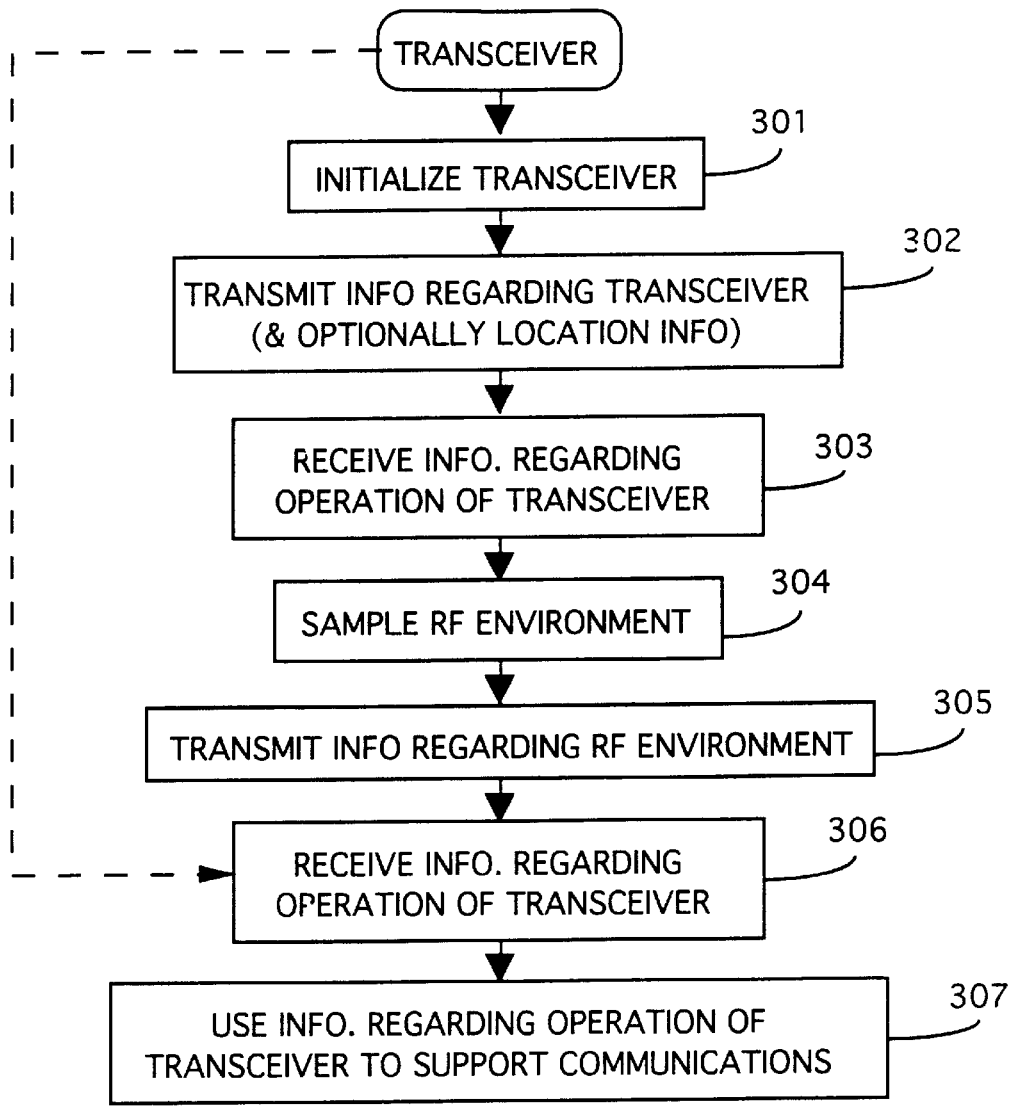
FIG. 3 is a flowchart describing operation of an infrastructure transceiver in accordance with the present invention.

The present invention anticipates that, in response to an infrastructure transceiver being added to, removed from, or modified within the system, other infrastructure transceivers, particularly neighboring infrastructure transceivers may need to be reconfigured also. The process of an infrastructure transceiver receiving such reconfiguration information is represented in FIG. 3 by the dotted line leading into step 306. That is, at any time, a given infrastructure transceiver could receive reconfiguration information similar to the information regarding operation described above. Alternatively, such reconfiguration information could be received in response to the occurrence of one of stimuli (ii) through (v), described above. The determination of such reconfiguration information is described in further detail below.

Having executed steps 301 through 306, the infrastructure transceiver completes the configuration mode and is prepared to enter the active mode at step 307. At step 307, the transceiver uses the information regarding operation of the transceiver to support communications. Thus, mobile/portable units within the coverage area of the transceiver can access the RF communication system in accordance with well known call processing techniques. The operating parameters previously supplied to the transceiver allow the transceiver to function in accordance with the rest of the RF communication system and, in particular, to operate without interference relative to other infrastructure transceivers. It is understood that the method of FIG. 3, while described with reference to a single infrastructure transceiver, can, and typically would, be asynchronously carried out by a large number of transceivers in a typical RF communication system.

In addition to the embodiment described above, the present invention anticipates that the steps of sampling the RF environment and transmitting the information thus derived could respectively be performed prior to and contemporaneously with the step of transmitting the information regarding the infrastructure transceiver (step 302). Thus, rather than waiting to sample the RF environment until after some information regarding operation of the transceiver had been received (step 303), the transceiver could automatically sample the RF environment, using pre-stored operating parameters, as soon as the initializing of step 301 is completed. Such a method could be used in those cases where the infrastructure transceiver is known to possess only a very limited set of operating capabilities (e.g., only a single modulation type or over a few distinct RF frequencies), thereby eliminating the need for extensive sampling of the RF environment.

Figure 4:
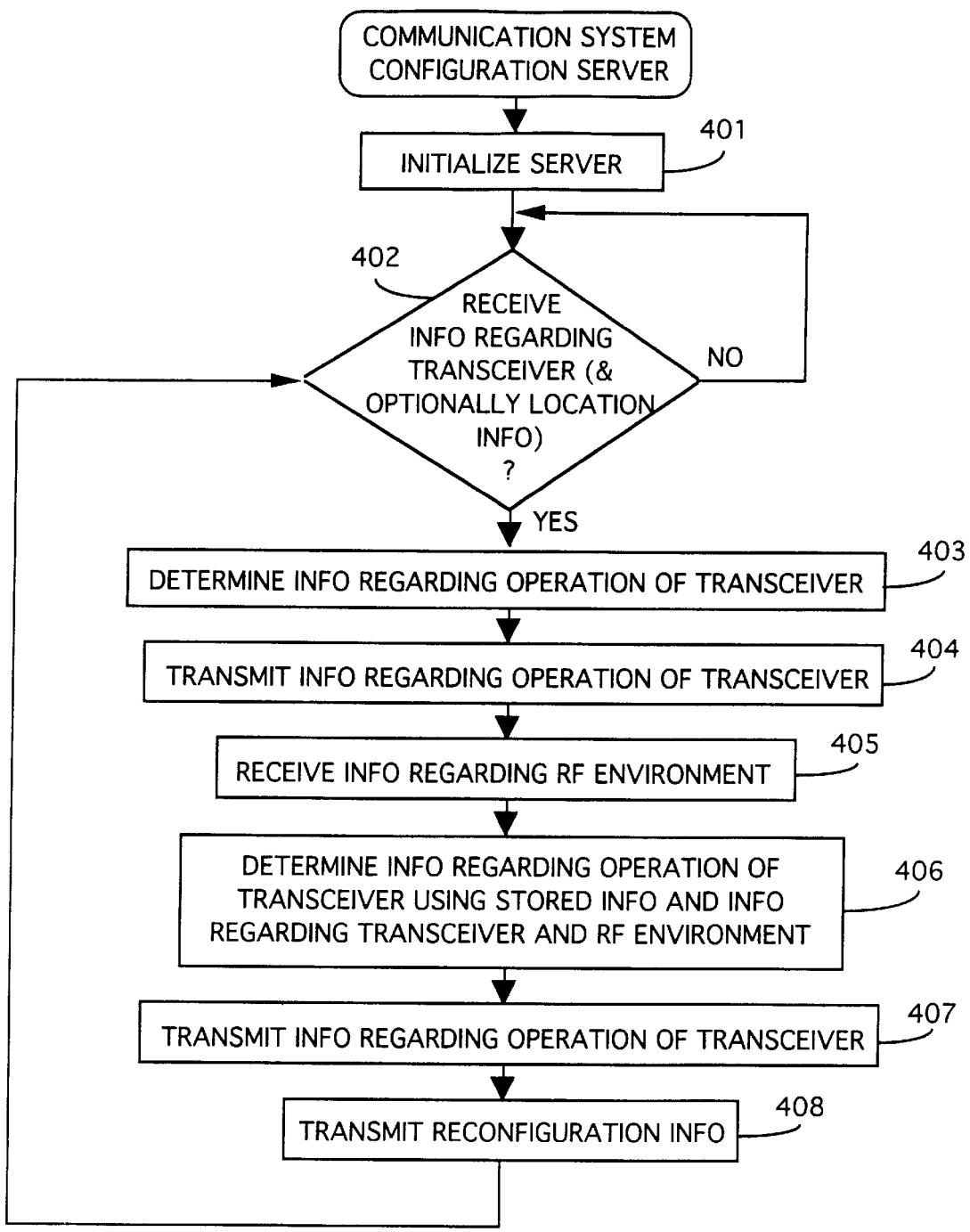
FIG. 4 is a flowchart describing operation of a communication system configuration server in accordance with the present invention.

Referring now to FIG. 4, operation of a communication system configuration server is described. At step 401, the communications system configuration server is initialized, and information regarding the RF communication system is stored in the configuration server. The stored information regarding the RF communication system comprises, but is not limited to: a system identification for the RF communication system; a pool of site identification for later assignment to infrastructure transceivers; location information for transceivers already part of the RF communication system; a list of RF channels available for use in the system, approximate locations in which the RF channels may be used, and any power restrictions applying to those channels and locations; a list of modulation types to be used within the system; and, optionally, programming code (software) appropriate for those modulations or other parameters. Algorithms, described below, for determining optimal resource usage within the RF communication system are also included. As the RF communication system develops with the addition/removal of infrastructure transceivers, the stored information also includes information regarding neighboring infrastructure transceivers.

With initialization complete, the configuration server begins operation and determines, at step 402, whether information regarding an infrastructure transceiver has been received. Such information is transmitted by the infrastructure transceiver while in the configuration mode, described above. A registration message included with the information regarding the infrastructure transceiver indicates to the configuration server that the infrastructure transceiver has been recently added to, or moved within, the network. In the preferred embodiment, the information is received from the transceiver via a land-based communication link, but could also be received from the transceiver via an RF link. The format of the received information is determined according to the protocol used by the communication link.

Responsive to the reception of information regarding the infrastructure transceiver, the configuration server, at step

403, determines information regarding operation of the transceiver, as discussed above relative to step 303. To this end, the configuration server refers to its list of available site identifications to select a site identification for the transceiver. The server also compares the geographic coordinates received from the transceiver (if any) with its RF channel availability table to determine which channels are able to be used proximal to first transceiver's location. If no location information is included, a more general list of RF channels is determined instead. At step 404, the information regarding operation of the infrastructure transceiver is transmitted to the infrastructure transceiver.

At step 405, the configuration server receives information regarding RF operating circumstances proximal to the infrastructure transceiver. As described above with reference to steps 304 and 305, the information regarding RF operating circumstances includes any information relevant to determining the current state of RF communications proximal to the infrastructure transceiver.

With the information regarding RF operating circumstances in its possession, along with the stored information regarding RF communication system, the information regarding the infrastructure transceiver, and (optionally) the information regarding location of the infrastructure transceiver, the configuration server, at step 406: identifies the list of RF channels to be used by the infrastructure transceiver; for each RF channel in the list, identifies the maximum transmit power level to be used by the transceiver; identifies a list of neighboring transceivers which produce co-channel interference with the transceiver, and hence, must have their transmit power levels reconfigured; identifies the list of neighbor cells which are appropriate for handover from the transceiver and at least one of the RF channels used in each of those cells; and identifies neighboring transceivers which must have their respective neighbor cell lists reconfigured. Collectively, the information thus determined constitutes part of the information regarding operation of the infrastructure transceiver. These determinations are generally made as follows:

First, the configuration server estimates the RF path loss between the transceiver and other nearby transceivers by analysis of the RF signal strength data (measured at step 304). Expressing the transmit and receive powers in decibels (dBs), path losses can be computed by simple subtraction, according to the equation:

$$PL = P_{Tx} - P_{Rx}$$

where $P_{Tx}$ is the RF carrier power transmitted from a nearby transceiver, $P_{Rx}$ is the RF carrier power received by the transceiver, and PL is the path loss between the two transceivers. Assume that transceiver 109 received an RF power level on Channel N of −103 dBm. Further assume that the site identifier which accompanied that signal indicated that it had been transmitted from transceiver 106. Since the configuration server stores transmit power information for all transceivers active in its system, it can refer to its stored information regarding the RF system to determine the transmit power for channel N at transceiver 106. Assume this power is 20 watts, or +43 dBm. The configuration server then calculates the path loss to be +43 −(−103)=146 dB. This analysis is repeated for all RF channels measured at step 304. For path loss estimates to other sites (other nearby transceivers), the transceiver's receiver sensitivity threshold (typically around −115 dBm) can be used to determine the truth of the relation:

$$PL > P_{Tx} - P_{Rx|threshold}$$

where $P_{Rx|threshold}$ is the receiver sensitivity threshold for the transceiver. The maximum number of channels which can be assigned to the transceiver depends upon the channel capacity of the transceiver. Optimally, this information is communicated to the server as part of the information regarding the transceiver (steps 302 and 402).

The RF channels previously identified to the infrastructure transceiver (step 404) are then considered by the configuration server. For each of these channels, the configuration server estimates the co-channel interference at the transceiver. This estimate involves identifying nearby sites which use those channels, the transmit power for those channels, and the path loss between those transceivers and the transceiver being analyzed. Any channel for which the estimated received co-channel signal power falls below a defined threshold (typically about −110 dBm, and included as part of the stored information regarding the RF communication system) is a candidate. The analysis should proceed in this manner until enough channels have been selected to satisfy the transceiver channel capacity requirement.

Many system configurations prefer to maintain groups of channel blocks which are reused at sites in an organized manner. Where this constraint exists, the blocking preferences are programmed into the configuration server as part of the stored information regarding the RF communication system, and considered as part of the channel selection analysis.

If it is not possible to find enough channels which satisfy the threshold requirement, then the configuration server selects those channels which produce the minimum levels of interference, and calculates reductions in the transmit power levels at those other site(s) in order reduce the interference at the transceiver to no more than the threshold level. As part of this analysis, a list of interfering transceivers requiring reconfiguration for transmitter power cutback, and a list of the corresponding power levels is retained for later use.

Once the set of RF channels has been selected for the transceiver, a similar path loss analysis is performed to determine whether the transceiver's power levels should be limited to prevent co-channel interference at other sites. This calculation normally assumes that the path losses are bi-directionally reciprocal, a valid first approximation. Assuming that a location for the transceiver has been determined (either by the transceiver or the configuration server, as discussed above), the configuration server can also incorporate information regarding topography proximal to the location of the particular transceiver to determine transmit power levels. The topography information (included as part of the stored information regarding the RF communication system) at least describes known environmental obstructions that affect propagation delays or create multipath interferences. For example, if the location of the transceiver is in an area surrounded by high buildings, the configuration server takes this into account by instructing the transceiver to operate at higher than normal transmit power levels because the buildings will shield neighboring sites from co-channel interference from that transceiver. A table of transceiver transmit power levels for each RF channel is developed in this manner.

The neighbor cell handover lists are determined as follows: Using the location coordinates for the transceiver, and for the other transceivers operational on the system, the configuration server computes the distance and the directional bearing between the transceiver and other nearby transceivers. Also, the transceiver's corresponding cell site geometry is estimated using the known transmitter power levels and well-known propagation loss equations. From this analysis, the neighboring cells, and hence, the neighboring transceivers can be identified. For example, if transceiver 109 is the transceiver being analyzed, transceivers 108 and 106 are in the neighboring or first tier of cells, whereas transceiver 107 is in the second tier. According to this methodology, the cells established by transceivers 106 and 108 would be handover candidates, whereas the cell established by transceiver 107 would be excluded from the list.

For each neighbor cell identified, the configuration server identifies at least one of the RF channels (optimally, that of the control channel) used by the transceiver in that neighboring cell. The identity of this RF channel is provided to the transceiver for use in supporting handovers between the transceiver and the corresponding neighbor cell transceiver. Additionally, the handover list in the neighbor cell transceiver is modified to add the new cell channel (established by the transceiver under consideration) to its neighbor channel list, and possibly to remove channel identifiers for one or more cells which are now further away than the new cell. As part of this analysis, a list of transceivers requiring reconfiguration is derived.

At step 407, the information regarding operation of the infrastructure transceiver (that is, the information determined at step 406) is transmitted to the infrastructure transceiver. In this manner, the infrastructure transceiver receives the information it requires to commence operations in the active mode.

As mentioned above, the configuration server also derives a list of neighboring transceivers that require reconfiguration as a result of the addition of the newest transceiver. It is understood, however, that the need for such reconfigurations could also arise due to the modification of an already existing infrastructure transceiver or, at the opposite extreme, due to the removal of an existing infrastructure transceiver. Indeed, the addition/modification/removal of a single infrastructure transceiver could trigger the reconfiguration of any number of other transceivers in the RF communication system. Hence, for each of the neighbor sites identified in 406, the configuration server will determine reconfiguration information in the same manner discussed above relative to step 406. Similarly, for each of the interfering sites identified at step 406, the configuration server determines reconfiguration information. Such reconfiguration information is transmitted, at step 408, to those transceivers requiring the reconfiguration information. Thus, it is seen that each transceiver in the system is able to receive new configuration mode information at any time, even while in the normal operational mode. Rather than interrupting active communications, actual modifications to operating parameters could of course be done when the channels are idle, as known in the art. Any configuration information or reconfiguration information derived at step 406 is used to update the stored information regarding the RF communication system such that future changes in the configuration of the RF communication system (e.g., adding another transceiver) will take into account the most recent changes to the system.

In addition to the embodiment described above, the present invention anticipates that steps 402 and 405 could both occur prior to step 406 without the intervening step 404. This would occur in those instances in which the infrastructure transceiver does not wait to receive information regarding its operation prior to sampling its RF environment, but rather automatically samples its RF environment as soon as the initialization (step 301) of the transceiver is completed, as described above.

The present invention provides for the automatic configuration of communication systems. In particular, an infrastructure transceiver, while in a configuration mode, transmits information about itself, its proximal RF operating conditions, optionally, information about its location and, in response, receives configuration information for later use in an active mode. In this manner, the need for iteratively performing simulations and field measurements to determine satisfactory system configuration is substantially eliminated.

We claim:

1. A method of adding an infrastructure transceiver to a radio frequency communication system comprising the steps of:

at the infrastructure transceiver:
  transmitting information regarding the infrastructure transceiver and at least some information regarding present location of the infrastructure transceiver;
at a communication system configuration server:
  receiving at least some of the information regarding the infrastructure transceiver and the present location of the infrastructure transceiver;
  using previously stored information regarding the radio frequency communication system and at least some of the information regarding the infrastructure transceiver and the present location of the infrastructure transceiver to determine configuration information;
  transmitting to the infrastructure transceiver the configuration information;
at the infrastructure transceiver:
  receiving the configuration information; and
  using the configuration information to support communications in the radio frequency communication system.

2. The method of claim 1, further comprising the step of using the previously stored information regarding the radio frequency communication system to determine configuration information, wherein the previously stored information comprises information regarding neighboring infrastructure transceivers.

3. The method of claim 1, further comprising the step of using the previously stored information regarding the radio frequency communication system to determine configuration information, wherein the previously stored information comprises algorithms for determining optimal resource usage within the radio frequency communication system.

4. The method of claim 1, further comprising the step of using the previously stored information regarding the radio frequency communication system to determine configuration information, wherein the previously stored information comprises information regarding topography proximal to the present location of the infrastructure transceiver.

5. The method of claim 1, the step of transmitting to the infrastructure transceiver the configuration information further includes the step of transmitting reconfiguration information to at least some neighboring infrastructure transceivers.

* * * * *